United States Patent [19]
Hazen et al.

[11] Patent Number: 5,640,941
[45] Date of Patent: Jun. 24, 1997

[54] INTERNAL COMBUSTION ENGINE WITH STRATIFIED CHARGE AND TUMBLE MOTION

[75] Inventors: David J. Hazen, Ann Arbor; Gordon W. Sweetnam, Milford, both of Mich.

[73] Assignee: Ford Motor Company, Dearborn, Mich.

[21] Appl. No.: 567,388

[22] Filed: Dec. 4, 1995

[51] Int. Cl.[6] .......................... F02M 17/00; F02M 31/02
[52] U.S. Cl. ........................ 123/306; 123/308; 123/430
[58] Field of Search .................................... 123/306, 308, 123/337, 430, 432

[56] References Cited

U.S. PATENT DOCUMENTS

| | | | |
|---|---|---|---|
| 5,050,557 | 9/1991 | Ishida et al. | 123/432 |
| 5,165,374 | 11/1992 | Chapman et al. | 123/308 |
| 5,311,848 | 5/1994 | Isaka et al. | 123/308 X |
| 5,359,972 | 11/1994 | Isaka | 123/308 |
| 5,477,823 | 12/1995 | Uchida | 123/432 X |

FOREIGN PATENT DOCUMENTS 2242226  9/1991  United Kingdom ................. 123/308

*Primary Examiner*—Tony M. Argenbright
*Attorney, Agent, or Firm*—Neil P. Ferraro

[57] ABSTRACT

An internal combustion engine with charge stratification and tumble motion is provided. A tumble control valve is located in the intake pore upstream of the fuel injector creating a high velocity airflow. Fuel injected by the fuel injector is entrained into the high velocity airflow produced by the tumble control valve thereby establishing an airflow within the cylinder having fuel rich and fuel lean regions. The airflow in the cylinder circulates about an axis substantially perpendicular to the axis of operation of the piston.

12 Claims, 4 Drawing Sheets

INTERNAL COMBUSTION ENGINE WITH STRATIFIED CHARGE AND TUMBLE MOTION

FIELD OF THE INVENTION

The present invention relates to an internal combustion engine having a stratified inlet charge, with a tumble control valve being used in conjunction with the location of a fuel injector to create charge stratification with tumble motion.

BACKGROUND OF THE INVENTION

In a stratified charge spark ignited engine, the air/fuel mixture is deliberately prepared in a non-homogeneous fashion to produce a small kernel of relatively rich mixture at the sparkplug while the remainder of the mixture is relatively lean. In one type of stratified charge engine, on the intake stroke, a large amount of very lean mixture is drawn through a main intake valve to a main combustion chamber. At the same time a small amount of rich mixture is drawn through an auxiliary intake valve into a pre-combustion chamber. At the end of the compression stroke, a sparkplug ignites the rich mixture in the pre-combustion chamber. As the rich mixture ignites, it in turn ignites the lean mixture in the main chamber. In such engines, therefore, the air/fuel mixture can be burned completely even if the air/fuel mixture, as a whole, is lean. Accordingly, fuel economy can be improved and regulated gaseous emissions, for example CO, $NO_x$ etc. contained in the exhaust of the engine can be reduced.

Various designs exist which eliminate the need for a pre-combustion chamber. For example, in U.S. Pat. Nos. 5,050,557 and 5,237,974, a charge stratification is produced by providing a multiple intake port engine where a fuel injector is placed in the air flowing through one of the intake pores such that the rich fuel mixture exits at the outlet of that intake port. The sparkplug fires near that intake port thereby igniting the rich mixture which in turn ignites the lean mixture.

Further, it is known that combustion in an internal combustion engine can be improved by controlling the amount of turbulence within the combustion chamber. A typical method of introducing such turbulence is to create a tumbling charge motion within the cylinder. Tumble can be achieved in a number of ways including unique intake port designs having a triangular cross-section as disclosed in U.S. Pat. No. 5,237,974 or the use of a tumble control valve (TCV) as disclosed in U.S. Pat. No. 5,165,374. In engines employing a triangular intake port design, manufacturing issues arise in controlling the dimensions for the triangular cross-section as well as increased manufacturing cost in producing such a design. And, more importantly, wide-open throttle power is limited by the intake port design. In engines using TCVs, a stratified charge has not be obtained because the fuel is introduced upstream of the TCV, which results in undesirable air/fuel mixing and fuel build-up on the surface of the TCV that causes a spread of the fuel across the inlet port resulting in non-stratified (homogeneous) charge. Additionally, the precise transient fuel delivery required by the stratified charge engine is not obtainable. As used herein, "upstream" means at a location remote from the cylinder of the engine. Conversely, "downstream" means at a location near the cylinder of the engine.

SUMMARY OF THE INVENTION

An object of the invention claimed herein is to produce charge stratification with tumble motion without the need for multiple uniquely shaped intake ports.

The above object is achieved, and problems of prior approaches are overcome by an internal combustion engine having charge stratification and tumble motion in a cylinder thereof that includes a piston disposed within the cylinder and axially operable therein; an intake port in fluid communication with the cylinder for supplying charge thereto; a fuel injector disposed to inject fuel into the intake port; and, a tumble control valve located in the intake port upstream of the fuel injector. Fuel injected by the fuel injector is entrained into a high velocity airflow produced by the tumble control valve. Thus, an airflow is established within the cylinder having fuel rich and fuel lean regions. The airflow in the cylinder circulates about an axis substantially perpendicular to the axis of operation of the piston.

According to another aspect of the present invention an internal combustion engine having charge stratification and tumble motion in a cylinder thereof includes a piston disposed within the cylinder and axially operable therein; and, an intake port being in fluid communications with the cylinder for supplying charge thereto. The intake port has an oblong shaped cross sectional area and has at least two intake valves disposed therein. A fuel injector is disposed to inject fuel into the intake port late the engine's intake stroke. A tumble control valve is located in the intake port upstream of the fuel injector. The tumble control valve operates between at least two positions and is configured to allow unrestricted airflow in a top 15% portion of the intake port area. Thus, a high velocity airflow is created such that the fuel injected by the fuel injector is entrained into the high velocity airflow produced by the tumble control valve. An airflow is thereby established within the cylinder having fuel rich and fuel lean regions. The airflow in the cylinder circulates about an axis substantially perpendicular to the axis of operation of the piston.

According to yet another aspect of the present invention, a method of producing a stratified charge with tumble motion in a cylinder of an internal combustion engine includes the steps of placing an intake port in fluid communication with the cylinder to supply charge to the cylinder; disposing a fuel injector in the intake port to inject fuel therein; and, locating a tumble control valve in the intake port upstream of the fuel injector. Fuel is injected from the fuel injector into a high velocity airflow produced by the tumble control valve.

Accordingly, an advantage of the present invention is that fuel economy can be increased while regulated exhaust emissions decreased by providing an engine having a stratified charge.

Another advantage of the present invention is that the maximum power of a conventional, homogeneous charge engine can still be achieved.

Still another advantage of the present invention is that a more efficient burn can be obtained by creating turbulence in the combustion chamber.

Yet another advantage of the present invention is that a unique intake port design is not needed and fuel does not build up on the TCV.

Other objects, features and advantages of the present invention will be readily appreciated by the reader of this specification.

BRIEF DESCRIPTION OF THE DRAWINGS

The invention will now be described, by way of example, with reference to the accompanying drawings, in which.

DETAILED DESCRIPTION OF THE INVENTION

Figure 1:
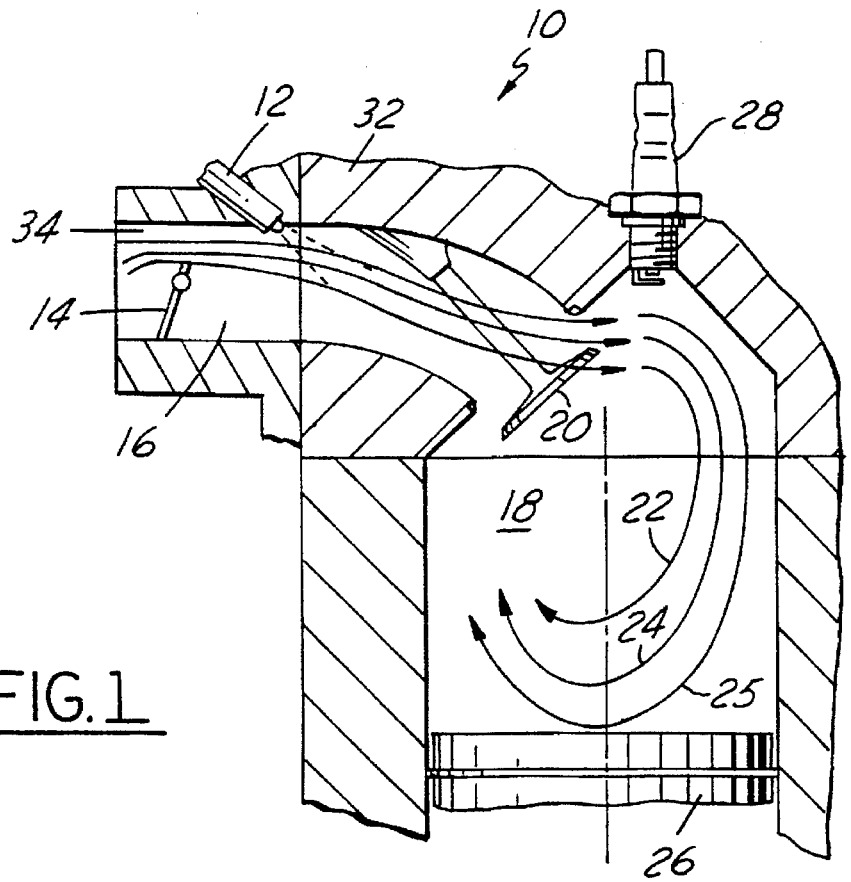
FIG. 1 is a diagrammatic cross-sectional view of one cylinder of an internal combustion engine showing the fuel injector located downstream of the tumble control valve.
Figure 2:
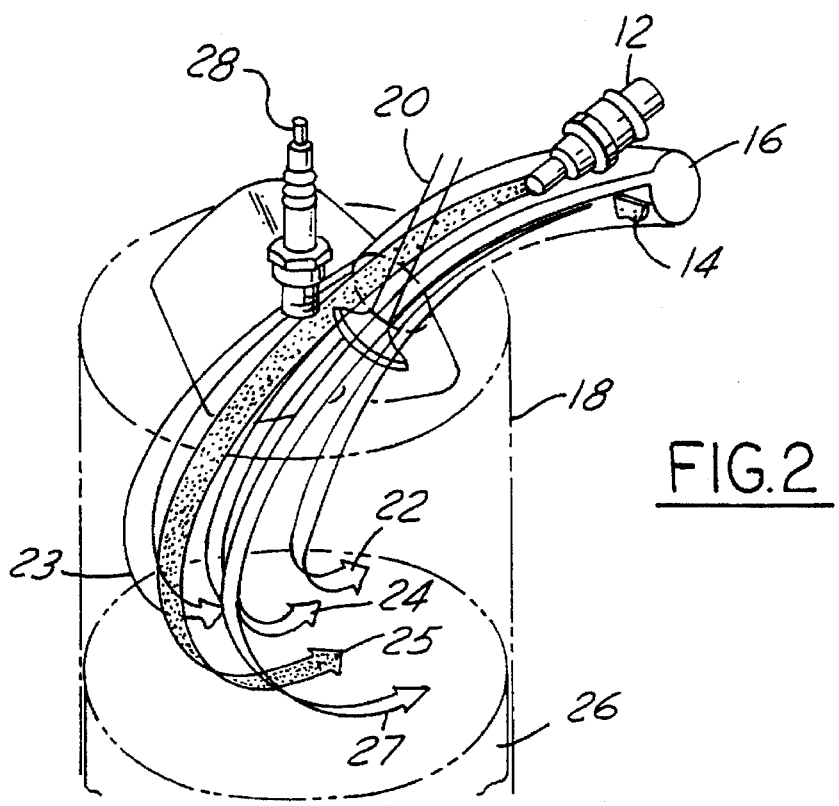
FIG. 2 is a diagrammatic perspective view of charge stratification with tumble motion in the cylinder according to the present invention.
Figure 3:
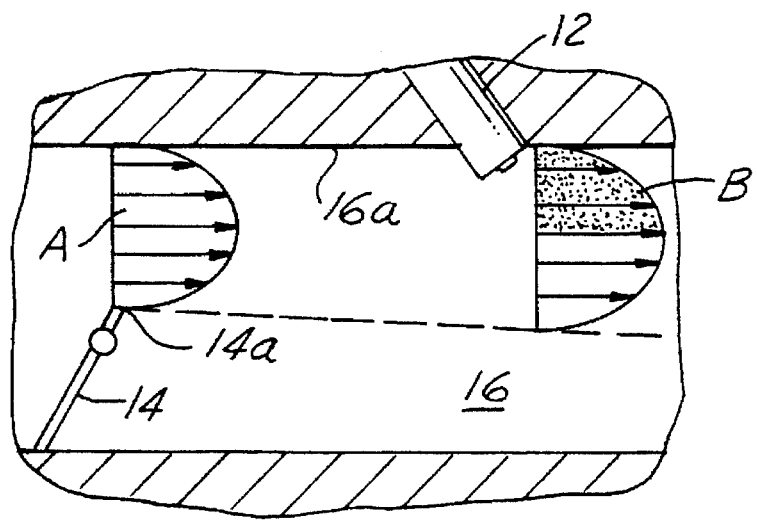
FIG. 3 is a diagrammatic cross-sectional view of the velocity profile of air flowing in the intake port.

Referring to FIGS. 1–3, to produce charge stratification with tumble motion in internal combustion engine 10 according to the present invention, fuel injector 12 is placed downstream of tumble control valve 14 (TCV). As air flows in intake port 16 past TCV 14 toward cylinder 18, the velocity of the airflow increases. The increase in airflow velocity is due to the configuration of TCV 14. That is, TCV 14 restricts airflow in a portion of intake port 16 such that air flowing past unrestricted portion 34 increases in velocity. FIG. 3 represents the velocity profile of airflow in intake port 16. As shown, the velocity of the air in the center of the airflow is greater than at either the top or bottom of the airflow as represented by the parabolic velocity profile generally shown at "A". Fuel delivery to intake port 16 is at least partially controlled by the timing of the firing of injector 12. By first establishing a strong, in-cylinder tumbling motion with high velocity airflow, fuel can be injected late in the intake stroke to reduce the residence time of the fuel in the chamber prior to ignition. This, in turn, requires very good atomization of the fuel in this short time. By injecting into the high velocity airflow, the fuel droplets are sheared by the airflow and atomize more rapidly. Thus, as the fuel enters intake port 16, the fuel penetrates the low velocity airflow at top 16a of intake port 16. However, once the fuel approaches the high velocity airflow, any further mixing of air/fuel is reduced. The high velocity airflow then transports the fuel to the cylinder 18 past valve 20. The fuel does not mix with the low velocity airflow flowing from top 14a of TCV 14 because the fuel is quickly transported to the combustion chamber prior to having had an opportunity to mix with the low velocity airflow. The relatively rich air/fuel mixture in intake port 16 is shown as the stippled portion of the airflow velocity profile generally shown at "B" in FIG. 3 and flow arrow 25 shown in FIGS. 1 and 2. Arrows 22 and 24, shown in FIGS. 1 and 2, represent the low velocity airflow carrying the relatively leaner portion of the air/fuel mixture. The result is a vertically stratified charge within cylinder 18. That is, an airflow is established within cylinder 18 having fuel rich and fuel lean regions, with the airflow in cylinder 18 circulating about an axis substantially perpendicular to the axis of operation of piston 26. (See further description with reference to FIG. 4).

Once the stratified charge is in cylinder 18, during the compression stroke of engine 10, piston 26 compresses the mixture. The compressed mixture is formed into a vortex on either side of the central region of cylinder 18. A rich mixture resides in the central region, while lean mixtures reside in regions on either side of the central region. Therefore, a laterally stratified charge is also produced as shown by flow arrows 23 and 27 adjacent flow arrow 25. Sparkplug 28 then ignites the rich fuel mixture (the portion of the mixture where the fuel was carried in by the high velocity airflow shown as arrow 25). Once ignition occurs, the flame propagates through the rich portion of the air/fuel mixture and into the leaner portion. Thus, according to the present invention, by placing injector 12 downstream of the TCV 14, charge stratification with tumble motion occurs in cylinder 18. Further, aiming injector 12 such that it directs the fuel toward the high velocity airflow and positioning sparkplug 28 such that it can ignite the rich portion is desired.

It should be noted that TCV 14 is operable between at least two positions. With TCV 14 closed, as shown in FIG. 1, a high level of tumble motion is produced in cylinder 18. With this high level comes high levels of turbulence at the time of combustion, which, in turn, provides a fast burn rate of the charge. When engine 10 operates at high engine speeds or loads, high levels of tumble can generate excessively fast burn rates which create NVH (noise, vibration and harshness) problems as well as component degradation. Additionally, static port designs that generate high levels of tumble are restrictive to high volume airflow and this limits the absolute power output of the engine. To avoid these problems, TCV 14 is opened at high engine speeds or loads to allow maximum unrestricted airflow, thereby decreasing the burn rate relative to that which can be achieved with high tumble levels.

Figure 5:
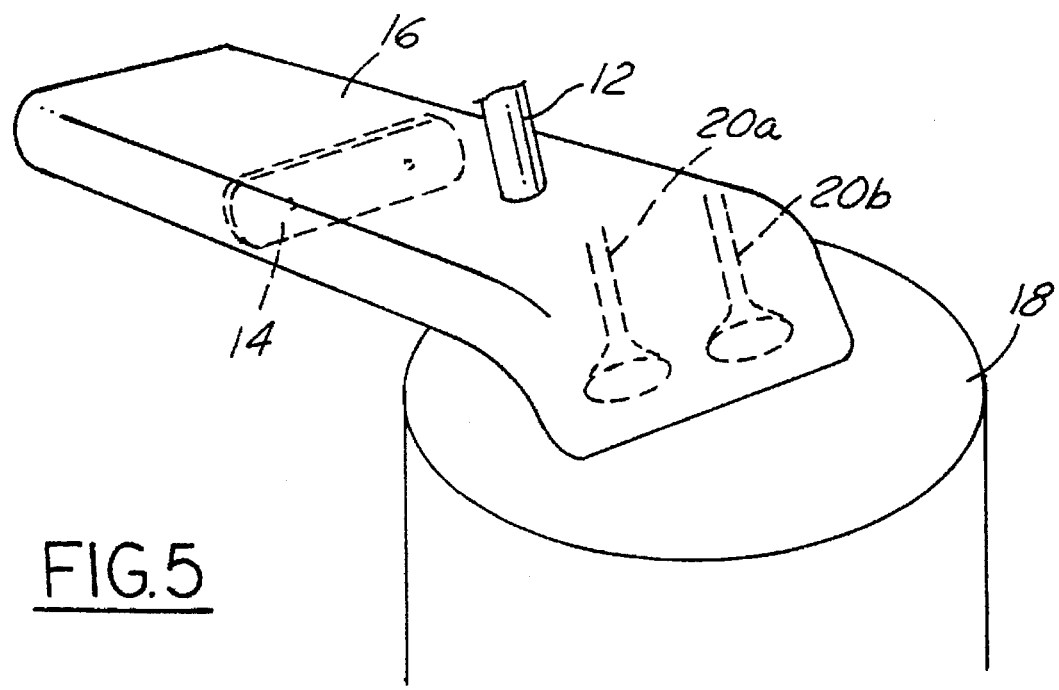

Turning now to FIGS. 4a–4j, various TCV configurations, which result in different velocity profiles of the airflow in intake port 16, are shown. These various configurations for TCV 14 have been tested in an intake port having an oblong shaped cross-section with at least two intake valves (21a and 21b) disposed therein as shown in FIG. 5, although the same design theory, according to the present invention, applies to circular intake port cross-sections with one intake valve. In FIGS. 4a–4j, the dashed line represents the boundary of the cross-section of intake port 16. These various configurations restrict a portion of the airflow in intake port 16 such that the air flowing past unrestricted portion 34 is at a higher velocity than the airflow in the remainder of intake port 16. That is, without wishing to be bound by the theory, according to Equation 1, velocity is inversely proportional to the cross-sectional area.

$$V = \dot{m}/\rho A \qquad \text{Eq. 1:}$$

where:
 V=velocity of air
 $\dot{m}$=mass flow rate
 ρ=density of air
 A=cross sectional area of the intake port Thus, as the area decreases, velocity increases. Further, without wishing to be bound by the theory, according to Equation 2, because momentum is proportional to the velocity, as the velocity of the airflow increases, the less likely it is that the rich fuel portion will migrate into the lean fuel portion. That is, the greater charge momentum created by the velocity increase helps to maintain the charge stratification in the in-cylinder flow.

$$\text{momentum} = mV \qquad \text{Eq. 2:}$$

where:
 m=mass of air
 V=velocity of air

Another significant effect of the increase in velocity of the airflow is the increase in kinetic energy of the in-cylinder flow. Without wishing to be bound by the theory, according to Equation 3, the kinetic energy of the charge in the cylinder increases with the square of the velocity which also has an important effect on maintaining the turbulence of the tumble motion.

$$K.E. = \tfrac{1}{2}mV^2 \qquad \text{Eq. 3:}$$

where:
K. E.=kinetic energy of air
m=mass of air
V=velocity of air

Figure 4A:
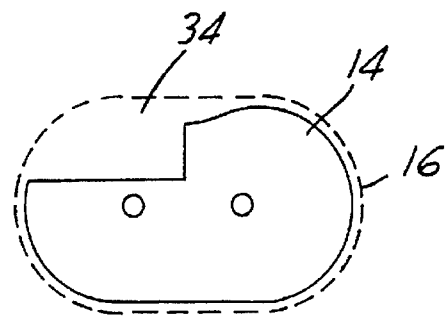
FIGS. 4A–4J show various tumble control valve configurations for a cylinder intake port having an oblong shaped cross-section; and, FIG. 5 is a diagrammatic perspective view of an intake port having an oblong shaped cross-section with two intake valves disposed therein.
Figure 4B:
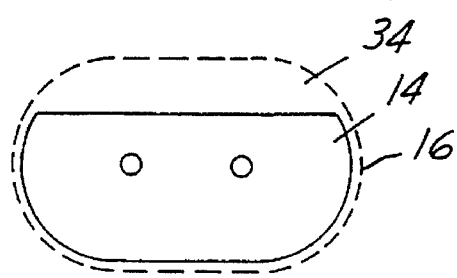
Figure 4C:
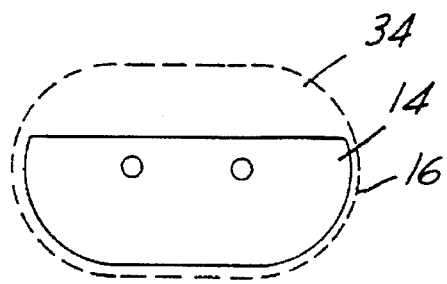
Figure 4D:
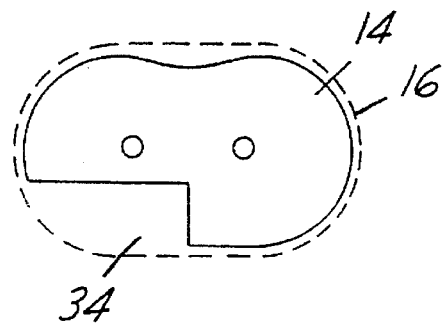
Figure 4E:
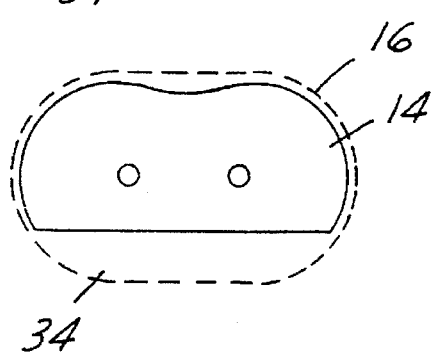
Figure 4F:
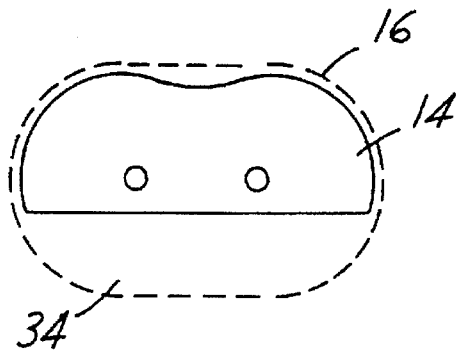
Figure 4G:
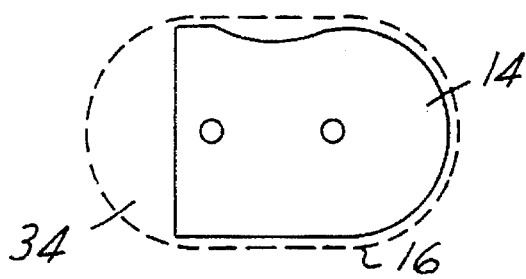
Figure 4H:
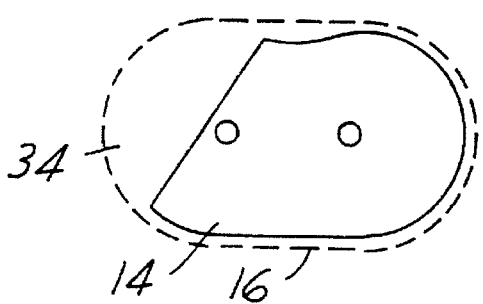
Figure 4I:
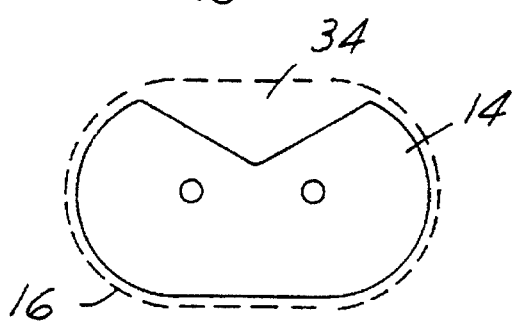
Figure 4J:
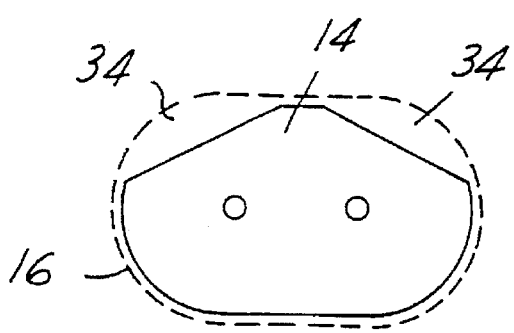

Thus, a vertically stratified charge with tumble motion, according to the present invention, can be achieved which has the benefit completely burning the air/fuel mixture even if the air/fuel mixture, as a whole, is lean, which increases fuel economy and reduces regulated gaseous emissions contained in the exhaust of the engine while improving combustion in the cylinder controlling the amount of turbulence within the combustion chamber. FIG. 4a shows TCV 14 creating unrestricted portion 34 located in an upper left corner such that 15% of the cross-sectional area of intake port 16 is unrestricted. FIGS. 4b and 4c are similar in that TCV 14 creates unrestricted portion 34 located in an upper portion of intake port 16. With respect to FIG. 4b, 15% of the cross-sectional area of intake port 16 is unrestricted; with respect to FIG. 4c, 30% is unrestricted. TCV 14 shown in FIG. 4d is similar to that shown in FIG. 4a except that a lower left corner is unrestricted. TCV 14 shown in FIGS. 4e and 4f are similar to that shown in FIGS. 4b and 4c, respectively, except that a bottom portion of intake port 16 is unrestricted. FIG. 4g shows 15% of a left side of intake port 16 unrestricted. FIG. 4h shows 15% of a left side and top left corner of intake port 16 unrestricted. FIG. 4i shows TCV 14 having a "V" shaped notch at the top such that 15% of intake port 16 is unrestricted. FIG. 4j shows TCV 14 having an inverted "V" section such that 7.5% of a left corner and 7.5% of a right corner of intake port 16 is unrestricted.

It has been determined through testing that a TCV allowing more than 30% of the cross-sectional area to remain unrestricted greatly inhibits the production of charge stratification with tumbling motion. Further, testing has shown that restricting intake port 16 such that only 10% of the airflow is allowed to pass results in poor engine performance. Therefore, it has been determined experimentally that a TCV 14 allowing 15% of intake port 16 to be unrestricted is desirable. According to the present invention, the location of the unrestricted airflow is important as well. It has been determined that a TCV 14 allowing the upper 15% of intake port 16 to remain unrestricted results in a desired airflow velocity which, when fuel is injected into the airflow, the desired charge stratification with tumble motion is produced. Thus, the configuration of TCV 14 is optimum when configured as shown in FIG. 4b, which results in the airflow velocity profile similar to that shown in FIG. 3. That is, a TCV allowing the upper 15% of the cross-sectional area of intake port 16 to remain unrestricted is preferred.

For a multi-intake valve per cylinder engine (i.e. at least two intake valves in an intake port having a substantially oblong shaped cross-section) with the sparkplug located in the center of the cylinder and having a symmetrical port design, the configurations of TCV 14 shown in FIGS. 4b, 4c, 4e, 4f, 4i and 4j are desirable with the configuration of TCV 14 shown in FIG. 4b being preferred. A symmetrical port design is one where the cross sectional area of the intake port does not bias the airflow toward one valve or another. For a non-symmetrical intake pore design, the configurations of TCV 14 shown in FIGS. 4a, 4d, 4g, and 4h are desirable.

In addition to producing charge stratification, reducing fuel build-up on the surface of TCV 14 is also accomplished by placing injector 12 downstream of TCV 14. In prior art configurations, injector 12 is located upstream of TCV 14 such that as fuel from injector 12 is emitted, fuel is deposited onto the surface of TCV 14 such that over time, the effectiveness of TCV 14 and fuel control are reduced.

While the best mode in carrying out the invention has been described in detail, those having ordinary skill in are in which this invention relates will recognize various alternative designs and embodiments, including those mentioned above, in practicing the invention that have been defined by the following claims.

We claim:
1. An internal combustion engine having charge stratification with tumble motion comprising:
a cylinder formed in said engine, said cylinder defining an axis;
a piston disposed within said cylinder and axially operable therein;
an intake port in fluid communication with said cylinder for supplying charge thereto, said intake port defining an axis;
a single intake valve disposed within said intake port, said single intake valve defining an axis;
a fuel injector disposed to inject fuel into said intake port;
a tumble control valve located in said intake port upstream of said fuel injector, with said tumble control valve being operable between at least a first, substantially unrestricting position and a second, substantially restricting position;
wherein fuel injected by said fuel injector is entrained into a relatively low velocity airflow, when said tumble control valve is in said first, substantially unrestricting position, with said relatively low velocity airflow thereafter entering said cylinder past said single intake valve; and,
wherein fuel injected by said fuel injector is entrained into a relatively high velocity airflow in said intake port, when said tumble control valve is in said second, substantially restricting position such that said relatively low velocity airflow is geometrically repositioned toward a top portion of said intake port to produce said relatively high velocity airflow, with said relatively high velocity airflow thereafter entering said cylinder past said single intake valve thereby establishing a stratified charge within said cylinder having fuel rich and fuel lean regions, with said stratified charge circulating about an axis substantially perpendicular to said cylinder axis.

2. An internal combustion engine according to claim 1 wherein said fuel injector injects fuel into said relatively high velocity airflow late in an intake stroke of said engine.

3. An internal combustion engine according to claim 1 wherein said intake port has a cross sectional configuration that is substantially oblong in shape.

4. An internal combustion engine according to claim 1 wherein said intake port has a cross-sectional configuration that is substantially circular in shape.

5. An internal combustion engine according to claim 1 wherein, when said tumble control valve is in said second, substantially restricting position, a flow area is defined within said intake port, with said flow area being in the range of about 10% to about 30% of the cross sectional area of said intake port.

6. An internal combustion engine according to claim 5 wherein said flow area is about 15% of the cross sectional area of said intake port.

7. An internal combustion engine according to claim 1 wherein said cylinder axis, said intake port axis and said single intake valve axis all lie in substantially the same plane.

8. An internal combustion engine according to claim 1 wherein said stratified charge is vertically stratified.

9. An internal combustion engine according to claim 8 further comprising a sparkplug having an ignition tip in communication with said cylinder, with said sparkplug ignition tip igniting said fuel rich region.

10. An internal combustion engine according to claim 8 wherein said vertically stratified charge comprises an outer, fuel rich region and an inner, fuel lean region.

11. An internal combustion engine according to claim 10 further comprising a sparkplug having an ignition tip in communication with said cylinder, with said sparkplug ignition tip igniting said outer, fuel rich region.

12. An internal combustion engine having charge stratification with tumble motion comprising:

a cylinder formed in said engine, said cylinder defining an axis;

a piston disposed within said cylinder and axially operable therein;

an intake port being in fluid communications with said cylinder for supplying charge thereto, said intake port defining an axis;

a single intake valve disposed within said intake port and said cylinder, said single intake valve defining an axis;

a fuel injector disposed to inject fuel into said intake port late in an intake stroke of said engine;

a tumble control valve located in said intake port upstream of said fuel injector, said tumble control valve being operable between at least a first, substantially unrestricting position and a second, substantially restricting position;

a sparkplug having an ignition tip in communication with said cylinder, with said sparkplug ignition tip, said intake port axis, said single intake valve axis and said cylinder axis all lying in substantially the same plane; and, wherein, when said tumble control valve is in said second, substantially restricting position, an airflow in said intake port is geometrically repositioned toward a top portion of said intake port so as to produce a high velocity airflow in said intake port such that said fuel injected by said fuel injector is entrained into said high velocity airflow, with said high velocity airflow thereafter entering said cylinder past said single intake valve thereby establishing a vertically stratified charge within said cylinder having an outer, fuel rich region and an inner, fuel lean region, with said outer, fuel rich region being in direct contact with said sparkplug ignition tip, with said vertically stratified charge circulating about an axis substantially perpendicular to said cylinder axis.

* * * * *